United States Patent [19]

Baits et al.

[11] Patent Number: 4,679,462
[45] Date of Patent: Jul. 14, 1987

[54] DIFFERENTIAL TRANSMISSION MECHANISM FOR A CONSTANT SPEED DRIVE

[75] Inventors: Stephen S. Baits; Richard W. Reynolds, both of Rockford, Ill.

[73] Assignee: Sundstrand Corporation, Rockford, Ill.

[21] Appl. No.: 685,474

[22] Filed: Dec. 24, 1984

[51] Int. Cl.$^4$ .............................................. F16H 47/04
[52] U.S. Cl. .......................................... 74/687; 74/720
[58] Field of Search .............. 74/687, 681, 720, 720.5, 74/730, 868, 856, 858

[56] References Cited

U.S. PATENT DOCUMENTS

| Re. 30,525 | 2/1981 | DeLalio | 74/687 |
|---|---|---|---|
| 3,107,490 | 10/1963 | Cooper | 74/687 |
| 3,274,855 | 9/1966 | Reynolds et al. | 74/687 |
| 3,303,724 | 2/1967 | Reeves, Jr. | 74/687 |
| 3,396,607 | 8/1968 | Ross | 74/687 |
| 3,470,769 | 10/1969 | Livezey | 74/687 |
| 3,600,106 | 8/1971 | Baits | 74/687 |
| 3,733,924 | 5/1973 | Zentz et al. | 74/687 |
| 3,733,931 | 5/1973 | Nyman et al. | 74/687 |
| 3,897,647 | 8/1975 | Chambers et al. | 74/687 |
| 3,903,756 | 9/1975 | Hamma | 74/687 |
| 3,969,957 | 7/1976 | DeLalio | 74/687 |
| 3,979,972 | 9/1976 | Sakai et al. | 74/687 |
| 3,990,327 | 11/1976 | Margolin | 74/720.5 |
| 4,019,404 | 4/1977 | Schauer | 74/687 |
| 4,306,467 | 12/1981 | Pollman | 74/687 |
| 4,373,408 | 2/1983 | Mills | 74/687 |

Primary Examiner—Leslie Braun
Assistant Examiner—David Novais
Attorney, Agent, or Firm—Wood, Dalton, Phillips, Mason & Rowe

[57] ABSTRACT

A differential transmission mechanism using an output differential for a constant speed drive has desirable characteristics including full utilization of the torque capabilities of the hydraulic trim device associated with the output differential; however, there is a limitation on the utilization of the speed capability of the hydraulic components of the trim device at the low end of the input speed range.

The disclosed differential transmission mechanism utilizing an output differential has a hydraulic trim device with a first hydraulic displacement unit having a normally fixed, approximately maximum displacement connected to an element of the output differential and a second hydraulic displacement unit which is of variable displacement connected to a variable speed input shaft. Additional components of the output differential are connected to the input shaft and to an output shaft connectable to a load. A sensing device senses the speed of the output shaft to control the displacement of the variable displacement hydraulic displacement unit to control the displacement thereof to achieve a constant output speed by varying the speed of the normally fixed displacement unit as required. Additionally, a sensor senses the speed of the input shaft and, when the speed of the input shaft is below a predetermined value, controls the displacement of the normally fixed displacement unit to reduce the displacement thereof to effectively make the latter displacement unit a smaller unit which will therefore operate at a faster speed to extend the range of the constant speed drive at the low end of the input speed range.

11 Claims, 2 Drawing Figures

DIFFERENTIAL TRANSMISSION MECHANISM FOR A CONSTANT SPEED DRIVE

DESCRIPTION

1. Technical Field

This invention pertains to a differential transmission mechanism for a constant speed drive which is driven by a variable speed input and provides an output at a constant speed. The mechanism utilizes an output differential and a hydraulic trim device having a pair of hydraulically interconnected displacement units. One of the displacement units, a pump, is of variable displacement to provide for a constant output speed by varying displacement thereof. The other hydraulic displacement unit, a motor, normally has a fixed maximum displacement, but can be adjusted to a lesser displacement at a lower range of input speeds to extend the range of input speeds at the low end thereof in which constant output speed can be achieved.

2. Background Art

Constant speed drives for achieving a constant output speed for driving a load with a varying input speed are well known in the art. An important use of such a constant speed drive is in aircraft for driving a generator or alternator providing a power source for the aircraft. The constant speed drive is driven by the aircraft engine which can operate at varying speeds.

Typically, the constant speed drive has a differential with a plurality of relatively movable elements and a trim device associated therewith. This trim device is usually a hydrostatic transmission in the form of a flow-connected hydraulic pump and motor and the hydraulic pump and motor are sized proportional to the speed range over which the constant speed drive must operate. There are two basic configurations of the differential transmission mechanism used as a constant speed drive. There can be either an input differential or an output differential. In each instance, the trim device can add or subtract speed at the differential as required to provide a constant output speed as the input speed varies.

When an input differential is used, the trim device, namely, the hydraulic pump and motor, can operate from maximum speed in one direction to maximum speed in the other direction, making maximum use of the speed capabilities of the trim device, but the torque varies inversely with the input speed causing less than maximum utilization of the torque capabilities of the trim device.

In an output differential, the torque of the trim device is independent of speed, allowing full utilization of the torque capabilities of the trim device, but the speed capability thereof is proportional to the input speed, thereby limiting the speed utilization at the low end of the input speed range.

The foregoing characteristics tend to produce the same size trim device for use with either an input or an output differential, except that with the input differential, the trim device must also provide the torque to make up its own losses which increase at the low end of the input speed range. Because of this, the output differential is usually used unless some other requirement makes an input differential attractive.

When the input differential is used, it is not uncommon to limit the loads on the low end of the speed range to reduce the size of the trim device. It is important to not over-size the trim device and the trim device is designed to be efficient when the constant speed drive is operating within a normal range of operative input speeds to provide a constant speed output.

In a differential transmission mechanism for a constant speed drive utilizing an output differential, it is conventional to have the plural relatively movable elements of the differential connected to the variable speed input, the constant speed output, and a component of the trim device, respectively. The component of the trim device is a fixed displacement hydraulic unit hydraulically connected to an overcenter variable displacement unit. The fixed displacement unit can only go as fast as the variable displacement unit. Therefore, when the input speed to the differential and to the variable displacement unit falls below a predetermined value, the fixed displacement unit is not rotating at a sufficient speed to result in achieving a constant speed output. In aircraft utilization, the normal input speed at which a constant speed output can be achieved is at engine idle and the constant speed drive can properly handle the loads that may be imposed thereon at engine idle speed and higher speeds.

The prior art does not disclose a differential transmission mechanism for a constant speed drive wherein the hydraulic trim device can be configured to take advantage of the torque characteristics of an output differential while still using the speed capacity of the pump and motor of the hydraulic trim device. This is achieved by reducing the displacement of the normally fixed displacement motor when operating at lower input speeds which are normally below the speed at which a constant speed drive is achieved.

DISCLOSURE OF THE INVENTION

The differential transmission mechanism for a constant speed drive utilizes an output differential having relatively movable elements with a pair of the elements connectable one to a variable speed input and another connected to an output to be driven at a constant speed and a third element connected to a component of a hydraulic trim device. The hydraulic trim device has a pair of hydraulic displacement units, with one unit being of normally fixed displacement at or near a maximum displacement and connected to the third element of the differential. The other hydraulic displacement unit is an overcenter variable displacement pump drivingly connected to the variable speed input. The normally fixed displacement unit will operate at a speed determined by the displacement of the variable displacement unit and either add or subtract speed to the output differential functioning as an output summer and, thereby, within a certain range of input speeds will result in a constant output speed.

The improvement resides in reducing the displacement of the normally fixed displacement unit to a lesser displacement when the input speed is below the speed at which normal constant speed drive is achieved to extend the range in which constant speed drive can be achieved and enable a constant speed drive at lower input speeds than heretofore known. This extension of the constant speed drive at the low end of the input speed range will be utilized when there is a reduced load requirement on the constant speed drive, since the normally fixed displacement unit has effectively been made smaller and will be attempting to handle the load. The range of input speeds at which a constant speed drive can be achieved has been increased without increasing the size of the units and, therefore, maximum efficiency can be achieved in the normal operating range.

An object of the invention is to provide a new and improved differential transmission mechanism for a constant speed drive utilizing an output differential having advantageous torque characteristics and with maximum use of the speed capacity of the hydraulic pump and motor constituting the trim device associated with the output differential by providing for a reduction in the displacement of the motor which is normally of fixed displacement.

Another object of the invention is to provide a differential transmission mechanism as defined in the preceding paragraph including a control for sensing the input speed to the differential mechanism and, when the input speed is below a predetermined value, the displacement of the motor is reduced to effectively increase the speed thereof relative to the speed of the pump which increases the range of input speeds in which a constant speed drive output can be achieved.

Still another object of the invention is to provide a differential transmission mechanism as defined in the preceding paragraphs wherein the control associated with the differential transmission mechanism includes means for limiting the load thereon when operating at input speeds below said predetermined value.

Another object of the invention is to provide a constant speed drive mechanism utilizing an output differential and a pair of hydraulically interconnected hydraulic displacement units wherein one of the hydraulic displacement units is connected into an element of the differential and is normally of fixed displacement and having means for sensing the input speed to the constant speed drive mechanism and operable to reduce the displacement of the above-mentioned hydraulic displacement unit to another, predetermined fixed displacement when the input speed is below a predetermined value.

Still another object of the invention is to provide a constant speed drive mechanism connectable to an input shaft operable at varying speeds and having an output differential and a hydraulic trim device associated therewith, said hydraulic trim device having a first hydraulic displacement unit connected to an element of the output differential and a second hydraulic displacement unit connectable to said input shaft and being of variable displacement, the improvement comprising, means for sensing the speed of the input shaft, and means for reducing the displacement of said first hydraulic displacement unit when said input shaft speed is below a predetermined value.

An additional object of the invention is to provide a constant speed drive mechanism wherein said first hydraulic displacement unit has a normally fixed predetermined displacement and which can be reduced when the input shaft speed is below said predetermined value.

A further object of the invention is to provide a constant speed drive mechanism including a load limiter for limiting the load applied to the output of the constant speed drive when the displacement of said first hydraulic displacement unit is reduced.

BEST MODE FOR CARRYING OUT THE INVENTION

Figure 1:
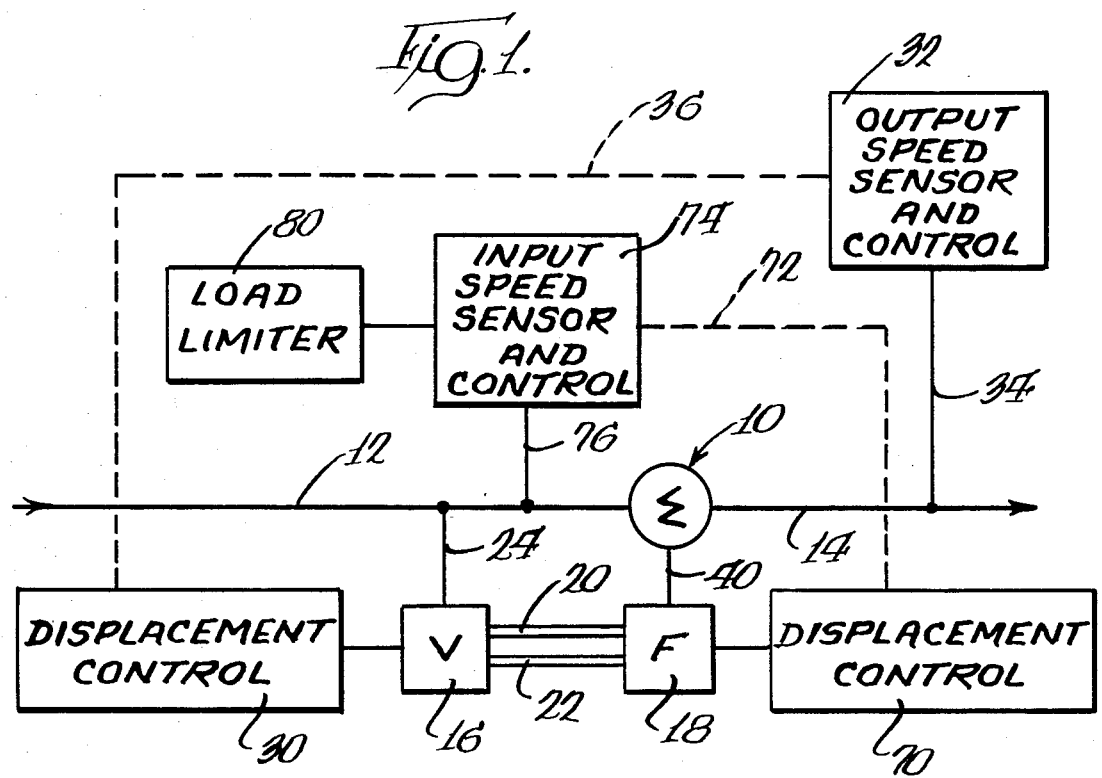
FIG. 1 is a schematic view of the output differential transmission mechanism for a constant speed drive.

The differential transmission mechanism usable as a constant speed drive is shown schematically in FIG. 1. The differential transmission mechanism has a planetary differential indicated generally at 10, functioning as an output differential, with three relatively movable elements. A planetary differential may take many different forms and can be of a type having a sun gear, a ring gear, and intermediate planet gears on a rotatable carrier or can have a pair of sun gears independently associated with planet gears on a carrier. One of the relatively movable elements of the planetary differential is connected to an input shaft 12 connectable to a variable speed input, such as an aircraft engine. A second element of the planetary differential is connected to an output shaft 14 connectable to a load, such as a generator or alternator used as an electrical power source for an aircraft.

A hydraulic trim device is associated with the planetary differential 10 and, as shown, is in the form of a hydrostatic transmission having hydraulic V and F units 16 and 18, respectively, which are hydraulically connected in closed circuit. The hydraulic interconnection is shown diagrammatically by hydraulic lines 20 and 22. The hydraulic trim device is well known in the art in association with the planetary differential 10 functioning as an output summer. The V unit 16 is an overcenter variable displacement device which is connected by a shaft 24 to the input shaft 12 whereby the unit is driven at the speed of the input shaft. The V unit can be an axial piston unit having a rotatable cylinder driven by the shaft 24 and carrying a series of axially movable pistons, the stroke of which is controlled by a wobbler, with the wobbler being variably positionable to determine the displacement of the V unit and with the displacement setting of the wobbler being under the control of a displacement control 30.

As conventional in a constant speed drive, the displacement control 30 is controlled by an output speed sensor and control 32 having an input 34 connected to the output shaft 14 to sense the speed of the output shaft and, through a control line 36, cause the displacement control 30 to set the displacement of the V unit 16 to achieve a constant speed for the output shaft 14.

The F unit 18 is of normally fixed displacement and connects to a third relatively movable element of the planetary differential 10 by means of a shaft 40. The F unit can also be of the axial piston type wherein a rotatable cylinder carries the axially movable pistons and the cylinder is connected to the shaft 40. A fixed displacement axial piston unit has a wobbler which is not variably positionable as conventionally understood in the art. A hydraulic trim device of the general type usable in the differential transmission mechanism disclosed herein is shown in Zentz et al. U.S. Pat. No. 3,733,924 and the disclosure thereof is incorporated herein by reference.

Figure 2:
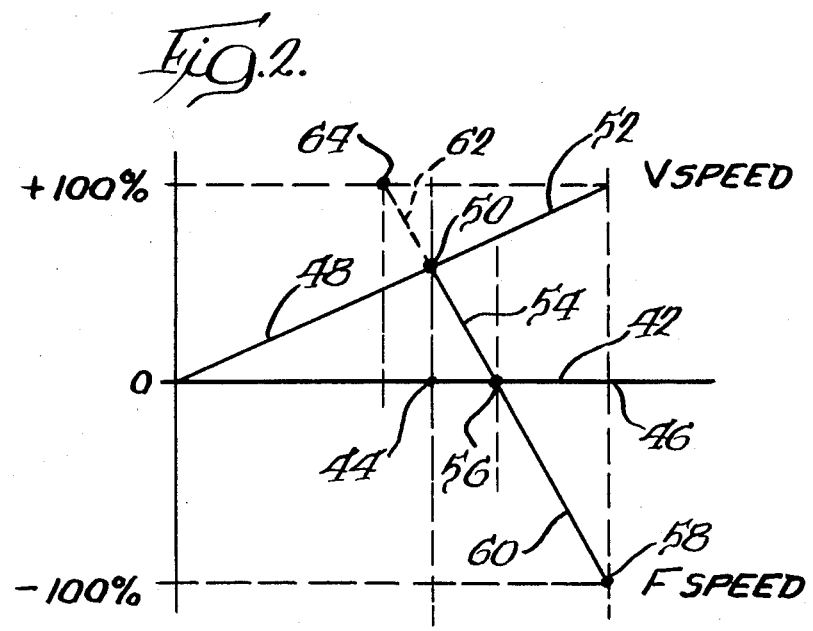
FIG. 2 is a speed diagram with the speed and the direction of operation of the hydraulic trim device components as the ordinate and the input speed to the constant speed drive as the abscissa.

Referring to FIG. 2, the speed of the input shaft is indicated by a line 42 which increases from zero toward the right as viewed in the speed diagram. Assuming the input to the constant speed drive is from an aircraft engine, upon start-up of the engine, the input speed commences at 0 and increases to an idle speed as indicated at point 44 and a maximum speed occurs at point 46. From 0 speed to idle speed, both the V and F units increase in speed, as indicated by a line 48, with the wobblers for the V and F units at one side of center, until a point 50 is reached. As the engine speed increases beyond idle, the speed of the V unit increases from point 50 as indicated by line 52. At point 50, the wobbler of the V unit is caused to move progressively towards zero displacement position, with resulting decrease in the speed of the F unit, as indicated by a line 54, and at point 56 the V unit is at zero displacement. As the wobbler of the V unit is moved to the other side of center, there is an increase in speed of the F unit from point 56 to a maximum speed at point 58 and along the line 60. The speed graph, as thus far described, is typical of an output differential transmission mechanism used as a constant speed drive.

From this graph it will be seen that the full speed capabilities of the F unit are not utilized, particularly at the lower input speeds below the speed indicated as the idle speed at point 44. In order to increase the range of operable speeds at which a constant speed drive can be achieved, the wobbler of the F unit 18 is made to be movable and controlled by means of a modulated control or a two-position control to a position which reduces the displacement thereof to a lower predetermined value. With reduced displacement, the F unit effectively becomes smaller and, thus, will rotate at a higher speed relative to the V unit. This increased speed capability is indicated by the broken line 62 which extends from point 50 to a point 64. This adjustment of the wobbler of the F unit 18 is achieved by means of a displacement control 70 having an output connected to the wobbler and which responds through a control line 72 to an input speed sensor and control 74 which, by a connection 76, senses speed of the input shaft 12.

When operating along the line 62, the constant speed drive does not have the load capability as when in normal operation and, therefore, a lesser load should be imposed. A means for achieving this is a load limiter 80 operatively connected to the input speed sensor and control 74 and which receives a signal operable to disconnect certain load components from the electric power circuit associated with the aircraft alternator or generator.

The adjustable wobbler of the F unit 18 and the displacement control 70 therefor can be of the basic type shown in the above-mentioned patent for providing a variable displacement hydraulic unit.

With the capability of adjusting the normally fixed displacement F unit 18, there can be an extension of the speed range at the lower end of input speeds to the constant speed drive, with a proportional reduction in load capacity. This is achieved by effectively increasing the speed of the F unit to provide an additional range of constant speed output at the lower input speeds. One of the uses for the extended speed range would be to place the constant speed drive for an aircraft in a ground check-out mode.

From the foregoing description, it will be evident that the constant speed drive embodies an output differential mechanism having a hydraulic trim device with a pair of hydraulically interconnected units with a V unit being an overcenter variable displacement device which is connected to a drive input. The F unit is connected to the differential and is a normally fixed displacement device, but having the capability of variable displacement. Means are provided for controlling the variable overcenter displacement hydraulic unit V to control the speed and direction of operation of the normally fixed displacement hydraulic unit to maintain a constant speed of the drive output with a varying speed of the drive input to the constant speed drive between a first range of drive input speeds.

The F unit, when at normal fixed displacement, operates between a maximum speed in one direction of operation between the points 56 and 58 of the graph of FIG. 2 and at less than maximum speed in the other direction of operation between the points 50 and 56 when the range of drive input speeds varies between points 44 and 46. With the reduction in displacement of the F unit 18, there can be a second range of drive input speeds between points 50 and 64 lower than the first range to provide for operation of the F unit 18 at increased speed up to a maximum at point 64 in said other direction of operation.

When the input speed to the constant speed drive is below a certain predetermined value, as indicated at point 44 in the graph of FIG. 2, the F unit 18 will operate at a lesser displacement than its normal fixed displacement to cause the F unit to effectively operate as a smaller unit at increased speed and which can provide a satisfactory constant speed drive output when there are reduced load requirements on the constant speed drive.

We claim:

1. A differential transmission mechanism for a constant speed drive connectable to a variable speed input and having a constant speed output above an input speed of a certain value comprising, an output differential having at least three relatively movable elements with one connectable to the variable speed input and another connectable to a load to be driven at a constant speed, a pair of hydraulically interconnected hydraulic displacement units with one connectable to the variable speed input and the other connected to the third element of the differential, said one hydraulic displacement unit being of the overcenter variable displacement type to modify the speed and direction of rotation of the other hydraulic displacement unit to maintain constant output speed as the input speed varies, and means for selectively setting the displacement of said other hydraulic displacement unit at any one of a plurality of different predetermined values whereby the displacement of said other hydraulic displacement unit may be reduced when the input speed is below said certain value to effectively increase the speed of the last-mentioned unit and provide an additional range of constant speed output at said lower input speeds.

2. A mechanism for a constant speed drive as defined in claim 1 including means for limiting the load on the constant speed drive operable when said input speed is below said certain value.

3. A constant speed drive mechanism connectable to an input shaft operable at varying speeds and having an output differential and a hydraulic trim device associated therewith, said hydraulic trim device having a first hydraulic displacement unit connected to an element of the output differential and a second hydraulic displacement unit connectable to said input shaft and being of variable displacement, the improvement comprising, means for sensing the speed of the input shaft, and means for selectively setting the displacement of said first hydraulic displacement unit at any one of a plurality of different predetermined values whereby the displacement of said other hydraulic displacement unit may be reduced when said input shaft speed is below a predetermined value.

4. A constant speed drive mechanism as defined in claim 3 wherein said first hydraulic displacement unit has a normally fixed displacement and which can be reduced when the input shaft speed is below said predetermined value.

5. A constant speed drive mechanism as defined in claim 3 including a load limiter for limiting the load applied to the output of the constant speed drive when the displacement of said first hydraulic displacement unit is reduced.

6. A hydraulic differential transmission comprising, a planetary gear differential having plural relatively movable elements with one element connected to a drive input, a second element connected to a drive output and a third element, a hydrostatic transmission having a pair of hydraulically interconnected hydraulic units, one of said hydraulic units being of variable overcenter displacement and connected to said drive input, the other of said hydraulic units being of variable displacement and connected to said third element of the planetary gear differential, means for controlling said variable overcenter displacement hydraulic unit to control the speed and direction of operation of the other hydraulic unit to maintain a constant speed of the drive output with a varying speed of the drive input between a first range of drive input speeds while said other hydraulic unit is set at maximum displacement, said other hydraulic unit operating between a maximum speed in one direction of operation and less than maximum speed in the other direction of operation as said first range of drive input speeds varies between a maximum and a minimum respectively, and means for selectively setting the displacement of said other hydraulic unit at any one of a plurality of different predetermined values whereby the displacement of said other hydraulic displacement unit may be reduced when the drive input is operating within a second range of drive input speeds lower than said first range to provide for operation of said other hydraulic unit at increased speed up to a maximum in said other direction of operation.

7. A hydraulic differential transmission as defined in claim 6 wherein said means for controlling said variable overcenter displacement device hydraulic unit includes a speed sensor for sensing the speed of said drive output.

8. A hydraulic differential transmission as defined in claim 7 wherein said means for reducing the displacement of the other hydraulic unit includes a speed sensor for sensing the speed of the drive input.

9. A hydraulic differential transmission comprising, a differential having plural relatively movable elements with one element connected to a drive input, a second element connected to a drive output and a third element, a hydrostatic transmission having a pair of hydraulically interconnected hydraulic units, one of said hydraulic units being of variable displacement and connected to said drive input, the other of said hydraulic units having at least two displacements and normally operable at a maximum displacement and connect to said third element of the differential, means for controlling said variable displacement hydraulic unit to control the speed of operation of the other hydraulic unit to maintain a constant speed of the drive output with a varying speed of the drive input between a first range of drive input speeds while said other hydraulic unit is set at maximum displacement, said other hydraulic unit operating at less than maximum speed at one end of a first range of drive input speeds and means for selectively changing the displacement of said other hydraulic unit from said maximum displacement whereby the displacement of said other hydraulic displacement unit is reduced when the drive input is operating within a second range of drive input speeds lower than said first range to provide for operation of said other hydraulic unit at increased speed.

10. A differential transmission for a constant speed drive which provides a constant output speed with a variable input speed comprising, a planetary differential with plural relatively movable elements, an input shaft connected to one of said elements, an output shaft connected to another one of said elements, a hydrostatic transmission comprising a pair of hydraulically interconnected displacement units with the first of the displacement units being of variable displacement and drivingly connected to said input shaft, the second of said displacement units being of a type having a selectively first predetermined maximum displacement position and at least one predetermined lesser displacement position and drivingly connected to a third element of the planetary differential, means responsive to the speed of the output shaft to control the displacement of the first displacement unit, and means for sensing the speed of the input shaft and causing the second displacement unit to operate at said predetermined lesser displacement position when the input speed is below a predetermined value.

11. A constant differential mechanism for a constant speed drive which provides a constant output speed with a variable input speed comprising, a planetary differential with plural relatively movable elements, and input shaft connected to one of said elements, an output shaft connected to another one of said elements, a pair of hydraulically interconnected rotatable displacement units with the first of the rotatable displacement units being of the overcenter variable displacement type and drivingly connected to said input shaft, the second of said rotatable displacement units being of a type having a selectively fixed predetermined maximum displacement position and at least one predetermined lesser displacement position and drivingly connected to a third element of the planetary differential, and means for sensing the speed of the input shaft and causing the second rotatable displacement unit to operate at said predetermined lesser displacement position when the input speed is below a predetermined value.

* * * * *